United States Patent [19]

Masaki

[11] Patent Number: 4,986,385

[45] Date of Patent: Jan. 22, 1991

[54] VEHICLE SPEED AUTOMATIC CONTROL DEVICE

[75] Inventor: Yozo Masaki, Yokohama, Japan

[73] Assignee: Jidosha Denki Kogyo Kabushiki Kaisha, Kanagawa, Japan

[21] Appl. No.: 430,692

[22] Filed: Oct. 31, 1989

[30] Foreign Application Priority Data

Oct. 31, 1988 [JP] Japan .............................. 63-142318[U]

[51] Int. Cl.⁵ .............................................. B60K 31/04
[52] U.S. Cl. .................................. 180/179; 364/426.04
[58] Field of Search ........................ 180/170, 178, 179; 364/426.04; 307/296.4

[56] References Cited

U.S. PATENT DOCUMENTS 4,850,250 7/1989 Nehmer et al. ................. 180/179 X
4,858,135 8/1989 Clish et al. ...................... 180/179 X
4,905,153 2/1990 Suzuki et al. ................... 180/179 X Primary Examiner—Charles A. Marmor
Assistant Examiner—Michael Mar
Attorney, Agent, or Firm—Sughrue, Mion, Zinn, Macpeak & Seas

[57] ABSTRACT

An automatic vehicle speed control device for controlling a running speed of a vehicle at a certain set speed includes a microcomputer having a vehicle speed memory for storing a vehicle speed upon operation of a command switch, a control circuit for adjusting a throttle valve through an actuator by calculating the difference between the stored vehicle speed of the vehicle speed memory and an actual vehicle speed, and a signal oscillating circuit for generating a watch dog pulse signal having a constant period under normal operation conditions. A monitor circuit having an exclusive NOR element for detecting watch dog pulses generated from the microcomputer senses whether or not the microcomputer has an abnormal operation and renders the actuator in a non-operated condition during the abnormal operation of the microcomputer.

1 Claim, 3 Drawing Sheets

VEHICLE SPEED AUTOMATIC CONTROL DEVICE

TECHNICAL FIELD

The present invention relates to an automatic vehicle speed control device for automatically controlling a running speed of a vehicle at a certain set speed.

BACKGROUND OF THE INVENTION

Such a conventional automatic vehicle speed control device is shown in FIG. 4 by a block diagram.

The automatic vehicle speed control device A comprises, as shown in FIG. 4, a controller B, a vehicle speed sensor C for outputting vehicle speed data proportional to an actual vehicle speed, a command switch D for outputting a cruise command signal, and an actuator F for driving a throttle valve E in its opening and closing directions. The controller B comprises a microcomputer, a drive circuit H for driving the actuator F by a common signal of the microcomputer G, a constant-voltage circuit I for supplying a predetermined voltage to the microcomputer G and a monitor circuit J for monitoring an operating condition of the microcomputer G by watch dog pulse signals having a constant period $T_0$ outputter from the microcomputer G and for placing the drive circuit H in a non-operated condition during abnormal, operation of the microcomputer. In FIG. 4, references K and L are a power supply source and a main switch.

The microcomputer G comprises a vehicle speed memory means for storing vehicle speed data of the vehicle speed sensor C upon operation of the command switch D, a control means for supplying a command to the drive circuit H based on the difference between the actual vehicle speed and the stored vehicle speed, and a signal oscillating means for outputting watch dog pulse signals having a constant period $T_0$ at normal operating.

As shown in FIG. 5, the monitor circuit J comprises a capacitor C101 being charged through a resistor R101 by a watch dog pulse signal "1" outputted from the microcomputer G and being discharged by a watch dog pulse signal "0" through a diode D101 and a resistor R102, and an operational amplifier OP101 having a non-inverted input (+) receiving a voltage of the capacitor C101 through a resistor R103 and an inverted input (−) receiving a reference voltage divided by resistors R104 and R105, and for generating an output signal converted from a level "0" to a level "1" when the voltage level at the non-inverted input (+) is more than the voltage level at the inverted input (−).

The automatic vehicle speed control device A operates as follows. The command switch D is at first in an On condition and then in an OFF condition. The actual vehicle speed at the above OFF condition is stored in the vehicle speed memory means provided in the microcomputer G. The control means provided in the microcomputer G compares a current or present vehicle speed with the stored vehicle speed of the vehicle speed memory means, operates the actuator F by the drive circuit H in accordance with the compared result (difference) and adjusts the opening and closing operation of the throttle valve so as to coincide the actual vehicle speed with the stored vehicle speed, thereby running the vehicle at the desired contact speed.

In such a vehicle speed control, the capacity C101 of the monitor circuit J is repeatedly charge and discharged by the watch dog pulse signals "1" and "0" having constant period $T_0$ generated from the microcomputer G, the output signal of the operation amplifier OP101 in the monitor circuit J is held at the level "0", and the drive circuit H is operated in accordance with the command signal from the microcomputer G, so that the microcomputer G operates normally. When the microcomputer G is in an abnormal condition from one cause or another and the watch dog pulse signal is held at the level "1", the capacitor C101 of the monitor circuit J is charged at the predetermined voltage and thus the output of the operational amplifier OP101 (that is, "C" shown in FIGS. 4 and 5) becomes the level "1", so that the command of the microcomputer G forbits the drive circuit H from operating, thereby preventing the actuator F from abnormally operating.

In the above conventional automatic vehicle speed control device A, when the microcomputer G is in an abnormal condition and the watch dog pulse signal is held at the level "1" the monitor J may detect this condition. However, as shown in FIG. 6, regardless of abnormal condition of the microcomputer G, there are some cases where the watch dog pulse signal is changed from the level "1" to the level "0" so that at such a condition, there capacitor C101 is held at the discharged condition and thus the abnormal condition of the microcomputer G can not be detected.

SUMMARY OF THE INVENTION

It is an object of the present invention to delete the above conventional disadvantage.

It is another object of the present invention to provide an automatic vehicle speed control device capable of surely detecting an abnormal condition of a microcomputer by a watch dog pulse signal generated from the microcomputer.

According to the present invention, there is provided an automatic vehicle speed control device comprising a microcomputer which includes a vehicle speed memory means for storing vehicle speed upon operation of a command switch, a control means for adjusting a throttle valve through an actuator by means of a difference between the stored vehicle speed of the vehicle speed memory means and an actual vehicle speed, and a signal oscillating for generating a watch dog pulse signal having a constant period at normal operating, characterized by comprising a monitor circuit having an exclusive NOR element for detecting watch dog pulses outputted from the microcomputer, said monitor circuit sensing whether or not the microcomputer has abnormal operation and making the actuator non-operating condition at the abnormal operation of the microcomputer.

According to the automatic vehicle speed control device according to the present invention, the output of an exclusive NOR element in the monitor circuit is changed from the level "1" to the level "0" only when the level of the watch dog pulse signal having a constant period generated from the microcomputer is inverted, after which the output of the exclusive NOR element is returned to the level "1" so that even when the microcomputer is in an abnormal condition and the watch dog pulse signal generated therefrom remains the level "0" or the level "1", the output of the exclusive NOR becomes the level "1" and thus the lapse or passage of the predetermined time can decide whether or not the microcomputer is in abnormal condition.

BRIEF DESCRIPTION OF THE DRAWINGS

The present invention may be better understood with reference to the following detailed description of exemplary embodiments thereof, taken in conjunction with the figures of the drawing in which.

DETAILED EXPLANATION OF THE PREFERRED EMBODIMENTS

According to the drawings, there is shown one embodiment of an automatic vehicle speed control device according to the present invention.

Figure 4:
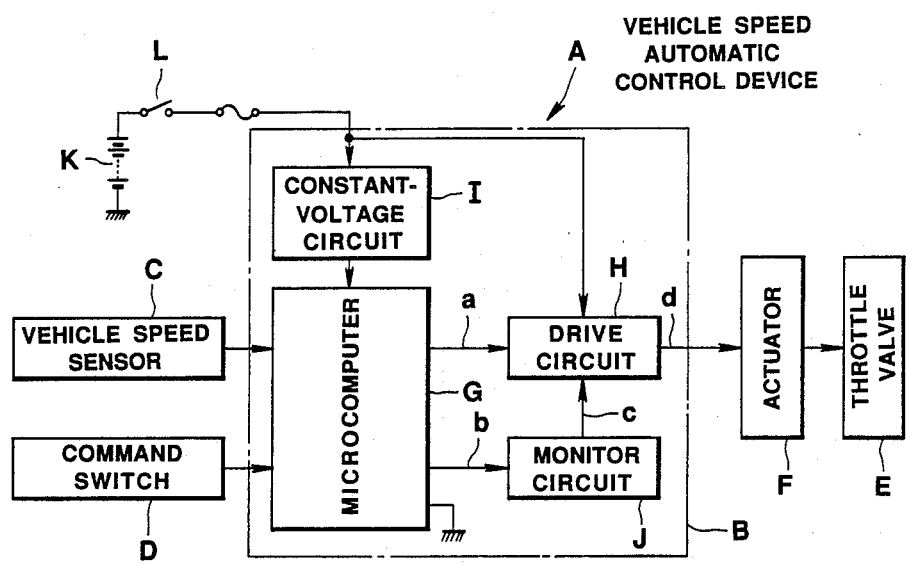
FIG. 4 is a block diagram showing the construction of the automatic vehicle speed control device according to the present invention.
Figure 5:
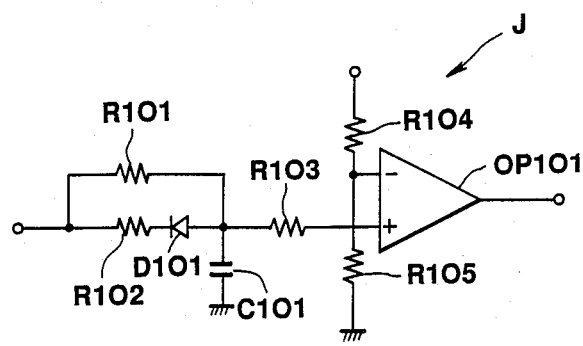
FIG. 5 is a circuit diagram showing the construction of a monitor circuit used in the conventional automatic vehicle speed control device.
Figure 6:
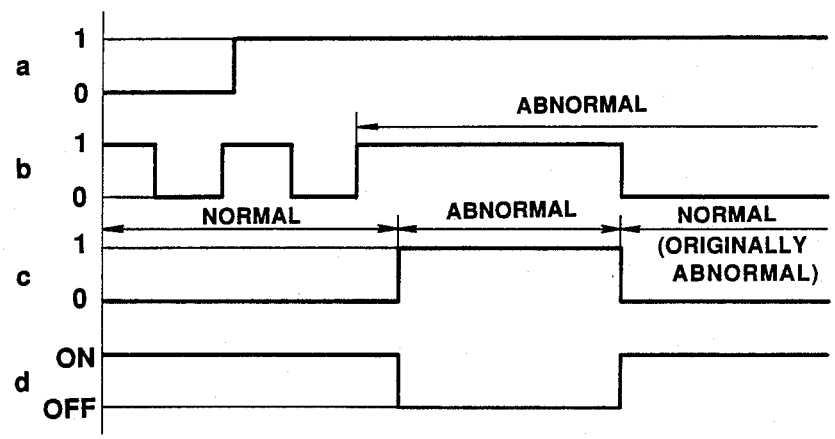
FIG. 6 is an explanatory view showing a time chart of the operation of the conventional automatic vehicle speed control device.

FIG. 4 shows one embodiment of the automatic vehicle speed control device according to the present invention. The major part of the automatic vehicle speed control device has been explained in the description of the prior art, so that the explanation of the previously described major part thereof will be omitted.

Figure 1:
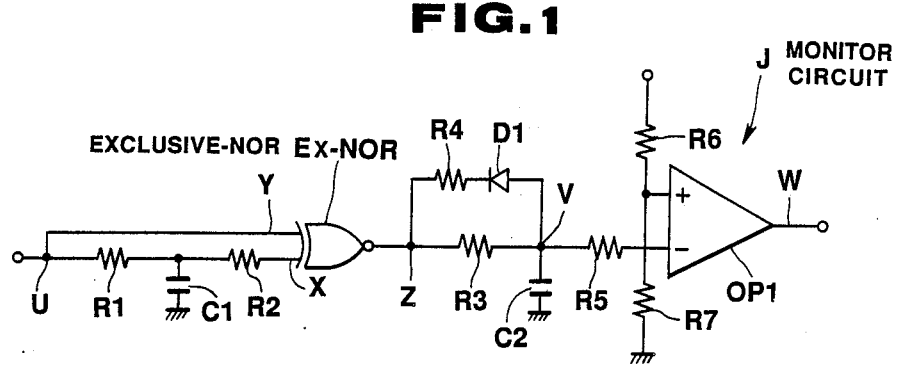
FIG. 1 is a circuit diagram showing the construction of a monitor circuit used in an automatic vehicle speed control device according to the present invention.

In the present invention, as shown in FIG. 1, the monitor circuit J comprises a capacitor C1 which is charged through a resistor R1 by the watch dog pulse signal "1" generated from the microcomputer G and discharged through the resistor R1 by the watch dog pulse signal "0", an exclusive NOR element Ex-NOR having an X terminal for receiving the voltage of the capacitor C1 through a resistor R2 and a Y terminal connected between the microcomputer G and the resistor R1, a capacitor C2 which is charged through a resistor R3 by an output signal "1" of the element Ex-NOR and discharged through a diode D1 and a resistor R4 by the output signal "0" of the element Ex-NOR, and an operational amplifier OP1 having an inverted input (−) receiving the voltage of the capacitor C2 through a resistor R5 and a non-inverted input (+) receiving a reference voltage being divided by a resistor R6 and a resistor R7 and for generating an output signal inverted from the level "1" to the level "0" when the voltage at the inverted input terminal (−) is larger than the voltage at the non-inverted input terminal (+).

The operation of the automatic vehicle speed control device A using the monitor circuit J thus constructed is explained with reference to FIGS. 2 and 3.

Figure 2:
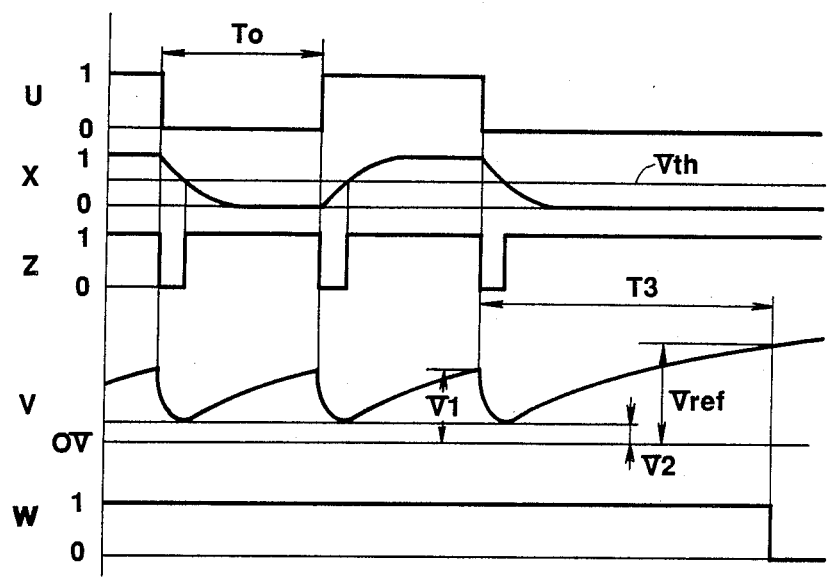
FIG. 2 is an explanatory view showing a time chart of the operation of the monitor circuit shown in FIG. 1.
Figure 3:
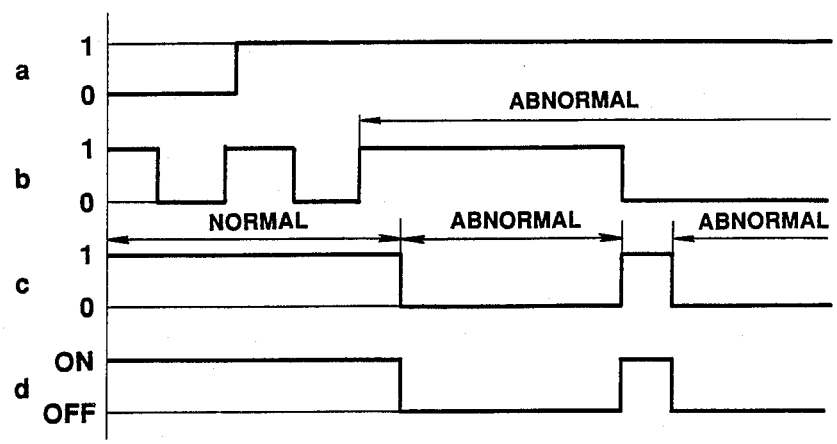
FIG. 3 is an explanatory view showing a time chart of the operation of the automatic vehicle speed control device according to the present invention.

When the watch dog pulse signal having a constant period $T_0$ is generated from the microcomputer G provided in the controller B, the capacitor C1 of the monitor circuit J is charged as shown in FIG. 2 by X in the case of the watch dog pulse signal being "1" and the capacitor C1 is discharged as shown in FIG. 2 by X in the case of the watch dog pulse signal being "0".

In this case, the watch dog pulse signal of the microcomputer G is directly supplied to the Y input terminal of the exclusive NOR element EX-NOR in the monitor circuit J so that voltage level of the capacitor at charging and discharging conditions is increased and decreased around an average voltage Vth, input signals at X and Y terminals of the exclusive NOR element Ex-NOR are coincided with each other and thus as shown in FIG. 2 by Z, the output signal of the exclusive NOR element Ex-NOR becomes the level "0" only when the watch dog pulse signal is changed from the level "0" to the level "1" or from the level "1" to the level "0", and becomes the level "1" elsewhere.

When the output signal of the exclusive NOR element Ex-NOR is the level "1" the capacitor C2 is charged through the resistor R3 and when the output signal of the exclusive NOR element Ex-NOR is the level "0" the capacitor C2 is discharged through the diode D1 and the resistor R4.

In this case, the connection point Z shown in FIG. 1 is subjected to feedback operation through the diode D1 and the resistor R4 and the watch dog pulse signal has a constant period $T_0$, so that as shown in FIg. 2 by V, the capacitor C2 is changed to the potential V1 and is discharged to the potential V2.

In this way, when the watch dog pulse signal is changed with the constant period $T_0$, the output signal of the operational amplifier OP1 remains at the level "1".

When the watch dog pulse signal is fixed to the level "0" due to any abnormal condition as shown in FIG. 2 by U, the input signals at X and Y terminals of the exclusive NOR element Ex-NOR of the monitor circuit J are coincide with each other around average voltage Vth so that as shown in FIG. 2 by Z, the output signal of the exclusive NOR element Ex-NOR remains at the level "1". When the voltage of the capacitor C2 becomes over the threshold voltage Vref after a lapse of predetermined time $T_3$ due to a continuous charging, the output signal of the operational amplifier OP1 is changed to the level "0" so that as shown in FIG. 3 by d, the operation of the drive circuit H is stopped and thus the command of the microcomputer G prevents the actuator F from being operated.

When the watch dog pulse signal is fixed to the level "1" due to the abnormal condition of the microcomputer G, the input signals of X and Y terminals of the exclusive NOR element Ex-NOR in the monitor circuit J are coincided with each other around the average voltage Vth, so that the output signal of the operational amplifier OP1 become the level "0" after the lapse of the predetermined time $T_3$ as in the above case.

Even when the watch dog pulse signal is fixed to the level "1" or the level "0" due to the possible abnormal condition of the microcomputer, this condition may be detected, resulting in a possibility of increasing the reliability of the automatic vehicle speed control device A.

What is claimed is:

1. An automatic vehicle speed control device comprising:
   a speed sensor generating a speed signal in response to a running speed of a vehicle;
   an actuator driving a throttle valve of the vehicle;
   memory means for storing the speed signal generated by the speed sensor in response to operation of a command switch provided in the vehicle;
   a driving circuit driving the actuator;

a microcomputer having means for comparing an actual speed signal detected by the speed sensor and a stored speed signal stored in the memory means and for generating a differential signal of the speed signals, means for controlling the driving circuit in response to the differential signal, and means for generating a watchdog pulse signal with a constant period in normal operation of the microcomputer, and a monitor circuit monitoring the condition of the microcomputer in which the monitor circuit prevents the operation of the actuator in the event of the abnormal condition of the microcomputer;

wherein said monitor circuit including:

(a) a signal input terminal to which the watchdog pulse signal is supplied;

(b) a resistor and capacitor circuit having a first resistor connected at the end to said signal input terminal and a second resistor and a first capacitor connected to the other end of the first resistor;

(c) an exclusive NOR gate having a first input terminal thereof connected to said signal input terminal and a second input terminal thereof connected to the second resistor of said resistor and capacitor circuit;

(d) a charging and discharging circuit having a third resistor connected at one end to the output terminal of said exclusive gate, a second capacitor connected to the other end of the third resistor, and a series circuit with a fourth resistor and a diode connected to the third resistor in parallel; and (e) an operational amplifier connected to said charging and discharging circuit to compare the output signal of said charging and discharging circuit with a predetermined reference voltage supplied thereto, said operational amplifier generating an output signal which prevents the operation of the actuator when the output signal of the charging and discharging circuit exceeds the predetermined threshold voltage.

* * * * *